United States Patent [19]

Pohl

[11] 4,448,834
[45] May 15, 1984

[54] FOIL AND METHOD FOR PROTECTING FILM

[75] Inventor: Claus Pohl, Eschenlohe, Fed. Rep. of Germany

[73] Assignee: Geimuplast Peter Mundt GmbH. & Co. KG., Farchant, Fed. Rep. of Germany

[21] Appl. No.: 368,354

[22] Filed: Apr. 14, 1982

[30] Foreign Application Priority Data

Apr. 15, 1981 [DE] Fed. Rep. of Germany ....... 3115288

[51] Int. Cl.³ .......................... B32B 3/04; B32B 31/18
[52] U.S. Cl. ..................................... 428/122; 156/202; 156/227; 156/250; 156/293; 206/460; 428/140; 428/194
[58] Field of Search ............... 428/343, 122, 194, 202, 428/140, 189; 156/303.1, 250, 293, 202, 227; 206/316, 460, 484; 352/233; 355/133

[56] References Cited

U.S. PATENT DOCUMENTS 3,119,015  1/1964  Kollock ................................ 206/316
3,976,376  8/1976  Hujer .................................... 352/233

Primary Examiner—Paul J. Thibodeau
Attorney, Agent, or Firm—Fleit, Jacobson, Cohn & Price

[57] ABSTRACT

A developed photographic film strip having protective foil on both sides is releasably connected to the foil at one margin of the film strip by pressure-sensitive adhesive, the other margin projecting from the foil so as to be accessible.

8 Claims, 5 Drawing Figures

FOIL AND METHOD FOR PROTECTING FILM

The invention relates to a protected film strip as well as to a method for enveloping and at intervals severing such a protected film strip.

It is known that photographic film has to be protected for packaging after being developed so as to prevent damage of the sensitive surface of the film during dispatch to the laboratory and return to the customer. The protective sleeves are generally transparent to permit assessment of the film within the protective sleeve.

For the purpose of enclosing and at intervals severing a protected film strip, two methods have become usual in practice. According to one method, the developed film alone or while adhered to other rolls is fed to an apparatus in which the film is covered with protective foil on both sides. Both outer edges of the foil are then interconnected (welded, adhered, crimped) and form a protective tube which lies flat about the film strip. In this enclosed condition, the film strip can then be sent to the customer rolled together or it is dispatched in handier short sections of generally four to six pictures placed in an envelope.

According another known method, the developed film is immediately severed into shorter sections. These are then dispatched to the recipient either in protective envelopes or in interconnected protective pockets which each receive one film section.

Whereas the steps of enclosing have to a large extent been mechanized, severing of the films into individual sections which are easier to mail is undertaken by costlier manual work. Since the film is protected by the protective sleeve on all sides, film perforations or marginal notching cannot be utilized for precise mechanical advance.

Even if the film is severed without a protective sleeve, cutting and insertion into the dispatch pockets takes place manually.

Apparatus is also known in which the feeding of the unenveloped film, as well as the severing and introduction into the protective pockets, takes place mechanically. Since a comparatively long film section of four to six pictures possesses very little inherent stability because of its considerable flexibility, it is difficult and technically expensive readily to insert the film in the dispatch pockets. The equipment available on the market is therefore expensive and susceptible to faults.

The invention is based on the problem of providing protected film strips which permit mechanical severing into individual sections, particularly in a manner such that marking notches provided in the film to mark the position of the individual pictures can be utilized for mechanical feeding and for recognizing the suitable severing stations.

The solution of this problem is by means of the teaching according to the invention as herein recited.

The enveloping and severing at predetermined intervals of a protected film strip takes place in accordance with the invention by means of the teaching hereinafter provided.

A transparent protective foil strip of about twice the width of the film strip to be protected is coated in its central region with a pressure-sensitive adhesive. When folding the protective foil over onto itself, this adhesive coated region then lies in the fold of the foil. During the folding step, the film to be protected is inserted in the foil and is then enclosed by the foil at both sides. The pressure-sensitive adhesive touches the margin of the film and holds it securely within the protective foil but releasably and without having a residue on the film.

It is also possible to use adhesives which make a bond only when touching each other but do not adhere to the surface of the film. In this case, the two foils are joined through the film perforations and thereby anchor the film section.

For the further processing of the film thus protected, feeding grippers and sensing and regulating elements for a mechanical feeder can engage into the open side of the system. This makes it possible to mechanize the severing steps and also to automate the process when using marking notches to define the cutting position. Thereafter, the severed film sections need only be inserted in a suitable collecting envelope, a step which can be combined in a mechanized manner with the severing apparatus.

The invention will now be described by way of example with reference to the drawing, wherein.

The process of enclosing and severing at predetermined intervals of the protected film is conducted as follows.

Figure 1:
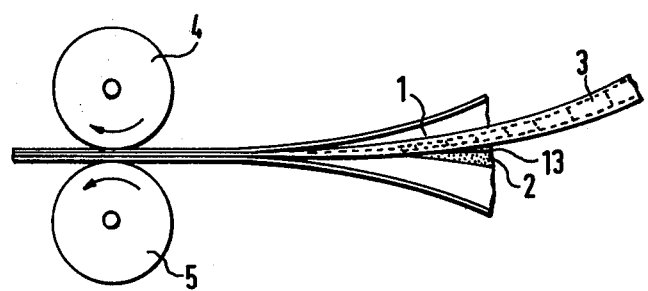
FIG. 1 illustrates the principle of an apparatus with which the foil is folded, the film is inserted in the protective foil and the film is connected to the foil.
Figure 2:
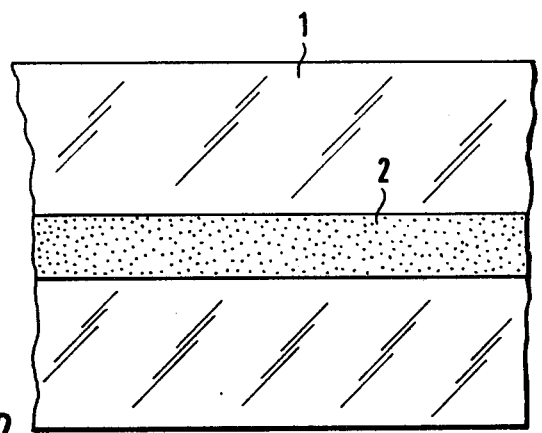
FIG. 2 shows the protective foil in the open unfolded condition.

A transparent plastics foil 1 has at its central region a layer 2 with the properties of a pressure-sensitive adhesive. By means of suitable guide tracks, the transparent foil 1 is folded together so that a fold line is created in the central strip 2. At the same time, the developed film 3 is fed as shown in FIG. 1 from a supply reel and then arrives in the operative zone of the pressure rollers 4, 5 which, by pressing on the region of the central strip 2, produce a releasable adhesive bond between the protective foil and the margin 6 of the film strip 3 or between the halves of the protective foil through the perforations in the film.

Figure 3:
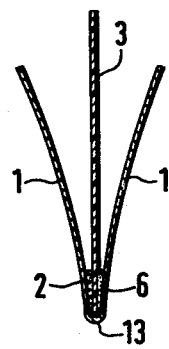
FIG. 3 is a section through the film and foil.
Figure 4:
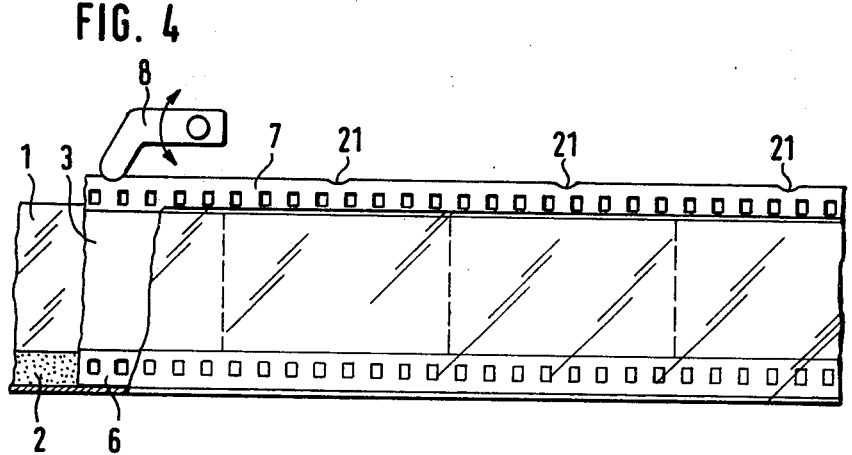
FIG. 4 is an elevation of the complete system of foil and film with diagrammatically illustrated feeding elements which are part of a mechanical feeding and severing apparatus.

FIG. 3 clearly shows that the protective foil is connected only to a margin 6 of the film in the zone 2. The composite protective foil and film so created can now be fed directly to a severing station or wound into supply reels for temporary storage.

In a feeding track (not shown) for a severing apparatus, known gripping elements can now intermittently feed the film to a severing station because the margin 7 of the film extends beyond the edge the protective foil and is accessible. Suitable feeding means are either single-tooth grippers, serrated feed rollers which engage the perforations of the film, or friction rollers. Since the margin 7 of the film extends beyond the edge of the protective foil and is freely accessible, marking notches 21 at the edge of the film for controlling the feed can be employed so that optical-electronic or mechanical means 8 scan the position of the notch to determine the cutting position. This edge notching is generally used in developing laboratories for the proper positioning of negative film during automatic copying of paper prints (printer) and for the proper severing in framing apparatus in the case of diapositive reversal film.

Figure 5:
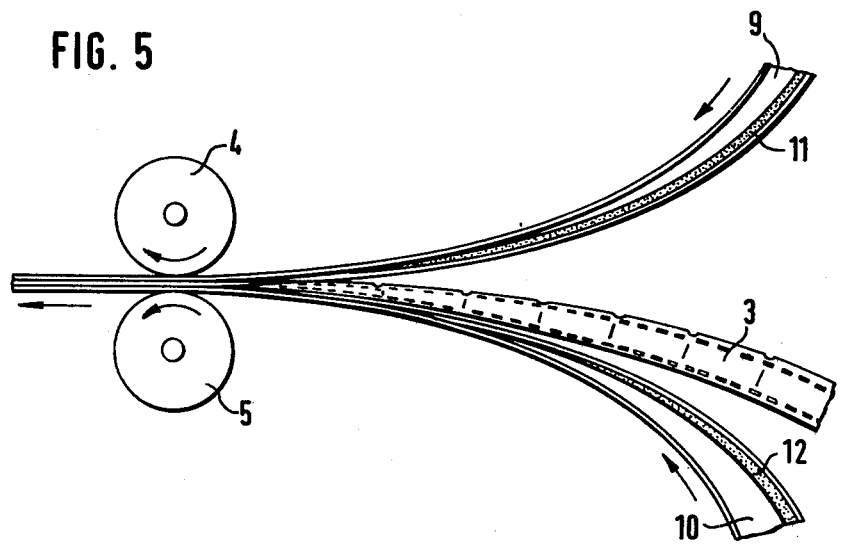
FIG. 5 is a view similar to FIG. 1 of a combining unit for the film and foil but utilizing two separate protective foils.

As shown in FIG. 5, the process as described above can also be carried out with two separate protective foil strips 9, 10 because, with the aid of the pressure-sensitive adhesive coating 11, 12, it is possible to join the foils to the film 3 at the margin 6 of the film. The advantage of this method is that different foils can be employed, one foil preferably being matte and the other transparent. For the viewer, this provides the advantage that the back of the film adjacent to the matte foil gives him a diffused viewing light whereas the front permits unimpeded viewing through the adjacent clear foil.

I claim:

1. A protected film strip comprising:
   (a) a developed rectangular photographic film strip having a front and back and two pairs of opposed marginal edges; and
   (b) a protective foil having a pressure sensitive adhesive, said foil releasably connected along one longitudinal marginal edge of said film strip, the remaining longitudinal marginal edge of said film strip extending beyond said protective foil.

2. The film strip of claim 1 wherein the protective foil includes one transparent foil adjacent the front of said strip and a matte foil adjacent the back of said film strip, each said foil including a pressure sensitive coating to permit joinder of said foils to said film strip.

3. The film strip of claim 1 wherein said film strip includes perforations and said pressure sensitive adhesive bonds only through contact with itself through said perforations.

4. The film strip of claim 1 wherein said pressure sensitive adhesive is coated in a central region of said protective foil, and said foil includes a fold line in the central region to receive and releasably secure a marginal edge of said film strip.

5. A method of protecting a film strip, said method comprising:
   (a) providing a foil strip having a centrally positioned pressure sensitive coating;
   (b) providing a rectangular film strip having two pairs of opposed marginal edges; and
   (c) enclosing said film strip with said foil strip by folding said foil strip over onto itself and over said film strip so that one longitudinal marginal edge of said film strip is releasably retained in said foil strip by said adhesive, the remaining longitudinal marginal edge of said film strip extending beyond said foil strip.

6. The method of claim 5 including the further step of severing said protected film strip at predetermined intervals.

7. The method of claim 5 wherein said foil strip includes two separate foil strips each having a pressure sensitive adhesive coating at a marginal edge thereof and wherein said method includes the additional steps of:
   feeding said film strip between said foil strips; and
   applying pressure at said marginal edges of said foil strips to releasably interconnect said foil strips to said film strip.

8. The method of claim 5 wherein said film strip includes marking notches at the marginal edge thereof extending beyond said foil strip and said method includes the further steps of:
   controlling the feed of said protected film strip by scanning the position of said marking notches; and
   severing said film strip based upon the positions of said marking notches.

* * * * *